United States Patent
Wang

(10) Patent No.: US 10,598,987 B2
(45) Date of Patent: Mar. 24, 2020

(54) LIQUID CRYSTAL GRATING AND DISPLAY PANEL

(71) Applicant: BOE TECHNOLOGY GROUP CO., LTD., Beijing (CN)

(72) Inventor: Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 48 days.

(21) Appl. No.: 16/022,931

(22) Filed: Jun. 29, 2018

(65) Prior Publication Data

US 2019/0086732 A1    Mar. 21, 2019

(30) Foreign Application Priority Data

Sep. 15, 2017    (CN) .......................... 2017 1 0832109

(51) Int. Cl.
| | |
|---|---|
| G02F 1/1335 | (2006.01) |
| G02F 1/1343 | (2006.01) |
| G02F 1/1337 | (2006.01) |
| F21V 8/00 | (2006.01) |

(Continued)

(52) U.S. Cl.
CPC ...... *G02F 1/133617* (2013.01); *G02F 1/1337* (2013.01); *G02F 1/13439* (2013.01);
(Continued)

(58) Field of Classification Search
CPC ......... G02F 1/133617; G02F 1/134309; G02F 1/1337; G02F 1/133504; G02F 1/13439;
(Continued)

(56) References Cited

U.S. PATENT DOCUMENTS

| | | | |
|---|---|---|---|
| 2014/0063382 A1 | 3/2014 | Wu | |
| 2016/0085118 A1* | 3/2016 | Lee | .................. G02F 1/133512 349/62 |

(Continued)

FOREIGN PATENT DOCUMENTS

| | | |
|---|---|---|
| CN | 102629041 A | 8/2012 |
| CN | 202443185 U | 9/2012 |

(Continued)

OTHER PUBLICATIONS

First Office Action for Chinese Patent Application No. 201710832109.5 dated Oct. 30, 2019.

*Primary Examiner* — Charles S Chang
(74) *Attorney, Agent, or Firm* — Calfee, Halter & Griswold LLP

(57) ABSTRACT

A liquid crystal grating includes a liquid crystal layer arranged between a first substrate and a second substrate; a quantum dot layer including a plurality of sub-pixels distributed in an array, each of the sub-pixels includes a light-shielding region located at a central portion of the sub-pixel and a quantum dot region that is separate from the light-shielding region; an electrode structure distributed across the plurality of sub-pixels; and a light input layer defining a plurality of light input ports each arranged opposite to the light-shielding region of a respective one of the sub-pixels. The electrode structure is configured to change light transmission of the liquid crystal layer depending on control voltages applied to the electrode structure.

20 Claims, 4 Drawing Sheets

(51) Int. Cl.
*G02F 1/13357* (2006.01)
*G02F 1/1362* (2006.01)

(52) U.S. Cl.
CPC .. *G02F 1/133504* (2013.01); *G02F 1/134309* (2013.01); *G02F 1/134363* (2013.01); *G02B 6/005* (2013.01); *G02F 1/1336* (2013.01); *G02F 1/133512* (2013.01); *G02F 1/136209* (2013.01); *G02F 2001/133614* (2013.01); *G02F 2001/134345* (2013.01); *G02F 2001/134372* (2013.01); *G02F 2202/36* (2013.01)

(58) Field of Classification Search
CPC ......... G02F 1/134363; G02F 1/133512; G02F 2001/133614; G02F 2202/36; G02F 2001/134345; G02F 1/1336; G02F 1/136209; G02F 2001/134372; G02B 6/005

USPC .................................................. 349/110–111
See application file for complete search history.

(56) References Cited

U.S. PATENT DOCUMENTS

| | | |
|---|---|---|
| 2017/0123120 A1 | 5/2017 | Shirouchi et al. |
| 2018/0348421 A1 | 12/2018 | Kim et al. |
| 2019/0339566 A1 | 11/2019 | Tan et al. |

FOREIGN PATENT DOCUMENTS

| | | |
|---|---|---|
| CN | 105044975 A | 11/2015 |
| CN | 106292049 A | 1/2017 |
| CN | 106526942 A | 3/2017 |
| CN | 106990604 A | 7/2017 |

\* cited by examiner

LIQUID CRYSTAL GRATING AND DISPLAY PANEL

CROSS-REFERENCE TO RELATED APPLICATIONS

This application claims the benefit of Chinese Patent Application No. 201710832109.5 filed on Sep. 15, 2017, the entire disclosure of which is incorporated herein by reference.

TECHNICAL FIELD

The present disclosure relates generally to the field of liquid crystal displays, and more particularly to a liquid crystal grating and a display panel.

BACKGROUND

A liquid crystal display (LCD) generally includes an upper substrate, a lower substrate, a color filter sandwiched between the upper substrate and the lower substrate, a liquid crystal layer, a transparent electrode layer and associated electronic elements, and a backlight module acting as a light source. An upper polarizer and a lower polarizer are also disposed above the upper substrate and below the lower substrate, respectively. The upper and lower polarizers and the color filter can cause a large loss of light emitted from the backlight module, resulting in a typical transmittance of only 5%.

SUMMARY

According to an aspect of the present disclosure, a liquid crystal grating is provided comprising: a first substrate; a second substrate arranged opposite to the first substrate; a liquid crystal layer arranged between the first substrate and the second substrate; a quantum dot layer arranged between the first substrate and the liquid crystal layer, the quantum dot layer comprising a plurality of sub-pixels distributed in an array, each of the sub-pixels comprising a light-shielding region located at a central portion of the sub-pixel and a quantum dot region that is separate from the light-shielding region; an electrode structure arranged between the first substrate and the second substrate and distributed across the plurality of sub-pixels; and a light input layer arranged between the second substrate and the liquid crystal layer, the light input layer defining a plurality of light input ports each arranged opposite to the light-shielding region of a respective one of the sub-pixels. The electrode structure is configured to change light transmission of the liquid crystal layer depending on control voltages applied to the electrode structure, thereby changing respective divergences of respective light beams, after transmitting through the liquid crystal layer, that enter the liquid crystal grating via the plurality of light input ports, and thereby changing respective amounts of the light beams impinging on respective ones of the quantum dot regions of the plurality of sub-pixels.

In some exemplary embodiments, the liquid crystal grating further comprises a first alignment layer arranged between the quantum dot layer and the liquid crystal layer and a second alignment layer arranged between the liquid crystal layer and the light input layer.

In some exemplary embodiments, the electrode structure comprises a plurality of slit electrodes arranged in the second alignment layer and distributed in an array, and the slit electrodes are arranged such that an orthographic projection of each of the sub-pixels on the second alignment layer covers a respective subset of the slit electrodes. In some exemplary embodiments, the electrode structure further comprises a transparent electrode layer arranged at a position selected from the group consisting of between the second alignment layer and the light input layer and between the quantum dot layer and the first alignment layer.

In some exemplary embodiments, the electrode structure comprises a plurality of slit electrodes arranged in the first alignment layer and distributed in an array, and the slit electrodes are arranged such that an orthogonal projection of each of the sub-pixels on the first alignment layer covers a respective subset of the slit electrodes. In some exemplary embodiments, the electrode structure further comprises a transparent electrode layer arranged at a position selected from the group consisting of between the second alignment layer and the light input layer and between the quantum dot layer and the first alignment layer.

In some exemplary embodiments, the plurality of light input ports penetrates through the light input layer, and a portion of the light input layer other than the plurality of light input ports is a light-shielding material.

In some exemplary embodiments, the liquid crystal grating further comprises a plurality of collimated light sources arranged at respective ones of the plurality of light input ports. A portion of the light input layer other than the plurality of light input ports is a transparent material.

In some exemplary embodiments, the liquid crystal grating further comprises respective additional shading regions arranged between directly adjacent ones of the plurality of sub-pixels.

In some exemplary embodiments, the liquid crystal grating further comprises a diffusion layer arranged between the quantum dot layer and the first alignment layer.

According to another aspect of the present disclosure, a display panel is provided comprising: a liquid crystal grating comprising: a first substrate; a second substrate arranged opposite to the first substrate; a liquid crystal layer arranged between the first substrate and the second substrate; a quantum dot layer arranged between the first substrate and the liquid crystal layer, the quantum dot layer comprising a plurality of sub-pixels distributed in an array, each of the sub-pixels comprising a light-shielding region located at a central portion of the sub-pixel and a quantum dot region that is separate from the light-shielding region; an electrode structure arranged between the first substrate and the second substrate and distributed across the plurality of sub-pixels; and a light input layer arranged between the second substrate and the liquid crystal layer, the light input layer defining a plurality of light input ports each arranged opposite to the light-shielding region of a respective one of the sub-pixels. The electrode structure is configured to change light transmission of the liquid crystal layer depending on control voltages applied to the electrode structure, thereby changing respective divergences of respective light beams, after transmitting through the liquid crystal layer, that enter the liquid crystal grating via the plurality of light input ports, and thereby changing respective amounts of the light beams impinging on respective ones of the quantum dot regions of the plurality of sub-pixels.

These and other aspects of the present disclosure will be apparent from and elucidated with reference to the embodiment(s) described hereinafter.

BRIEF DESCRIPTION OF THE DRAWINGS

Further features, objects, and advantages of the present application will become more apparent from the non-limiting embodiments described below with reference to the accompanying drawings, in which.

DETAILED DESCRIPTION

Figure 1:
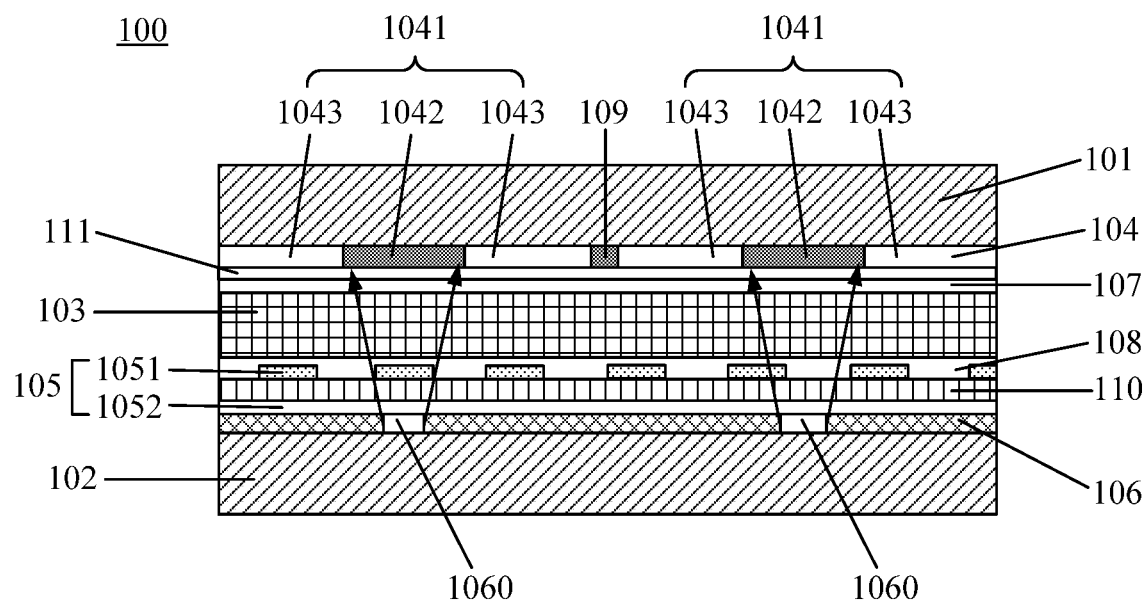
FIG. 1 is a schematic cross-sectional view of a liquid crystal grating according to an embodiment of the present disclosure.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "directly adjacent to" another element or layer, there are no intervening elements or layers present. In no event, however, should "on" or "directly on" be construed as requiring a layer to completely cover an underlying layer.

Embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Embodiments of the present disclosure will be described below with reference to the drawings.

FIG. 1 is a schematic cross-sectional view of a liquid crystal grating 100 according to an embodiment of the present disclosure. Referring to FIG. 1, the liquid crystal grating 100 includes a first substrate 101, a second substrate 102 disposed opposite to the first substrate 101, a liquid crystal layer 103 disposed between the first substrate 101 and the second substrate 102, a quantum dot layer 104 disposed between the first substrate 101 and the liquid crystal layer 103, an electrode structure 105 disposed between the first substrate 101 and the second substrate 102, and a light input layer 106 disposed between the second substrate 102 and the liquid crystal layer 103.

The quantum dot layer 104 includes a plurality of sub-pixels 1041 distributed in an array. Each of the sub-pixels 1041 includes a light-shielding region 1042 located at a central portion of the sub-pixel and a quantum dot region 1043 other than the light-shielding region 1042. The light-shielding region 1042 may be formed of, for example, a black matrix (BM) material, and the quantum dot region 1043 is formed of a quantum dot material. As is known, the quantum dot material is a nano-semiconductor capable of converting light within a certain wavelength range incident thereon into light of a specific wavelength range, and the wavelength (i.e., color) of the light emitted by the nano-semiconductor varies with the size of the nano-semiconductor. In this embodiment, the respective quantum dot regions 1043 of the plurality of sub-pixels 1041 may have respective sizes such that directly adjacent ones of the plurality of sub-pixels 1041 emit different colors of light. Specifically, the sub-pixels 1041 may include a plurality of red sub-pixels, a plurality of green sub-pixels, and a plurality of blue sub-pixels. In embodiments, these different colored sub-pixels may be distributed in the quantum dot layer 104 in any suitable pattern. The presence of the quantum dot layer 104 eliminates the need for color filters, thereby facilitating the increase in transmittance.

The liquid crystal grating 100 further includes a first alignment layer 107 disposed between the quantum dot layer 104 and the liquid crystal layer 103 and a second alignment layer 108 disposed between the liquid crystal layer 103 and the light input layer 106. Both the first alignment layer 107 and the second alignment layer 108, formed of, e.g., polyimide (PI), are used to set an initial deflection direction of the liquid crystal molecules in the liquid crystal layer 103.

In the example of FIG. 1, the electrode structure 105 includes a plurality of slit electrodes 1051 disposed in the second alignment layer 108 and a transparent electrode layer 1052 disposed between the second alignment layer 108 and the light input layer 106. The slit electrodes 1051 and the transparent electrode layer 1052 may be formed of a transparent conductive material such as, for example, indium tin oxide (ITO). The insulating layer 110, formed of, for example, polyvinyl chloride (PVC), is disposed between the second alignment layer 108 and the transparent electrode layer 1052 to provide electrical insulation between the slit electrodes 1051 and the transparent electrode layer 1052. The slit electrodes 1051 and the transparent electrode layer 1052 may be applied with control voltages in order to control the light transmission of the liquid crystal layer 103. For example, the slit electrodes 1051 may be applied with respective positive voltages, and the transparent electrode layer 1052 may be applied with a voltage of 0 V.

Figure 2:
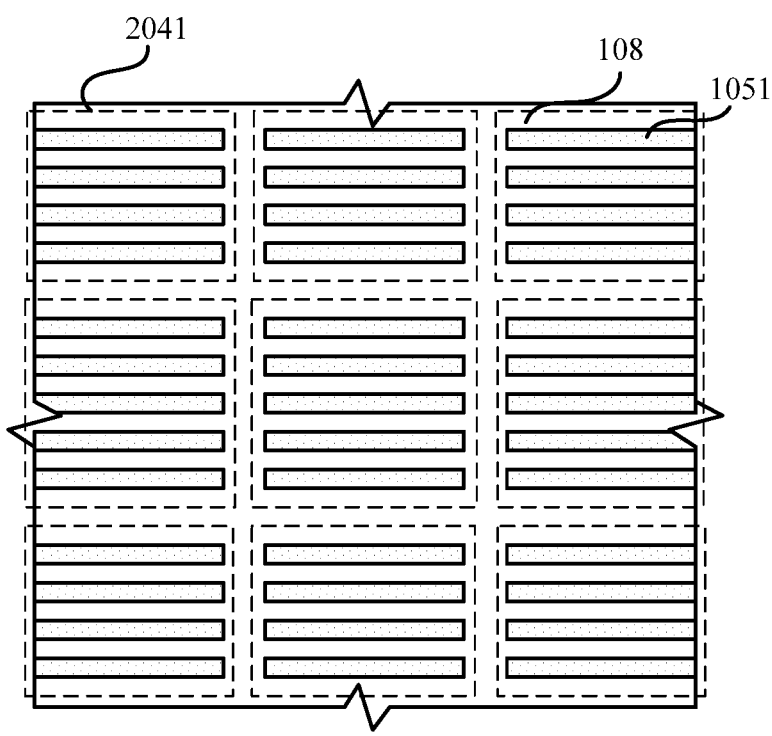
FIG. 2 is a plan view schematically illustrating an arrangement of slit electrodes in the liquid crystal grating of FIG. 1.

FIG. 2 more intuitively illustrates an arrangement of the slit electrodes 1051 of FIG. 1. Referring to FIG. 2, the slit electrodes 1051 are electrode strips having an elongated shape and are arranged in an array in the second alignment layer 108. The slit electrodes 1051 may be distributed across the plurality of sub-pixels 1041 of FIG. 1. In FIG. 2, the dashed box 2041 indicate orthographic projections of the sub-pixels 1041 of FIG. 1 on the second alignment layer 108, each of which covers a respective subset of the slit electrodes 1051. The number of the slit electrodes 1051 covered by the orthographic projection 2041 of each sub-pixel 1041 is exemplary in FIG. 2. In other embodiments, the orthogonal projection 2041 of the sub-pixel 1041 may cover more or less slit electrodes 1051 depending on the sizes of the sub-pixel 1041 and the slit electrode 1051.

Referring back to FIG. 1, the light input layer 106 defines a plurality of light input ports 1060, each of which is arranged opposite to the light-shielding region 1042 of a respective one of the sub-pixels 1041. The light beams (indicated by the arrowed line) entering the liquid crystal grating 100 via the light input ports 1060 may impinge on the quantum dot layer 104 after transmitting through the liquid crystal layer 103. FIG. 1 shows a default state of the liquid crystal grating 100 in which the respective light beams entering the liquid crystal grating 100 via the plurality of light input ports 1060 impinge on respective ones of the light-shielding regions 1042 of the plurality of sub-pixels 1041 without impinging on the quantum dot regions 1043 of the plurality of sub-pixels 1041. In this case, the plurality of sub-pixels 1041 will not be excited to emit an amount of light that can be perceived by the human eye. Therefore, the liquid crystal grating 100 displays a grayscale of L0 in the state of FIG. 1.

The electrode structure 105 is distributed across the plurality of sub-pixels 1041 to control light transmission throughout the liquid crystal layer 103. This can change respective divergences of the respective light beams, after passing through the liquid crystal layer 103, that enter the liquid crystal grating 100 via the plurality of light input ports 1060, thereby changing respective amounts of the light beams impinging on respective ones of the quantum dot regions of the plurality of sub-pixels 1041. In this way, the plurality of sub-pixels 1041 may be excited to emit different amounts of light such that each of the plurality of sub-pixels 1041 displays a corresponding gray level.

Figure 3:
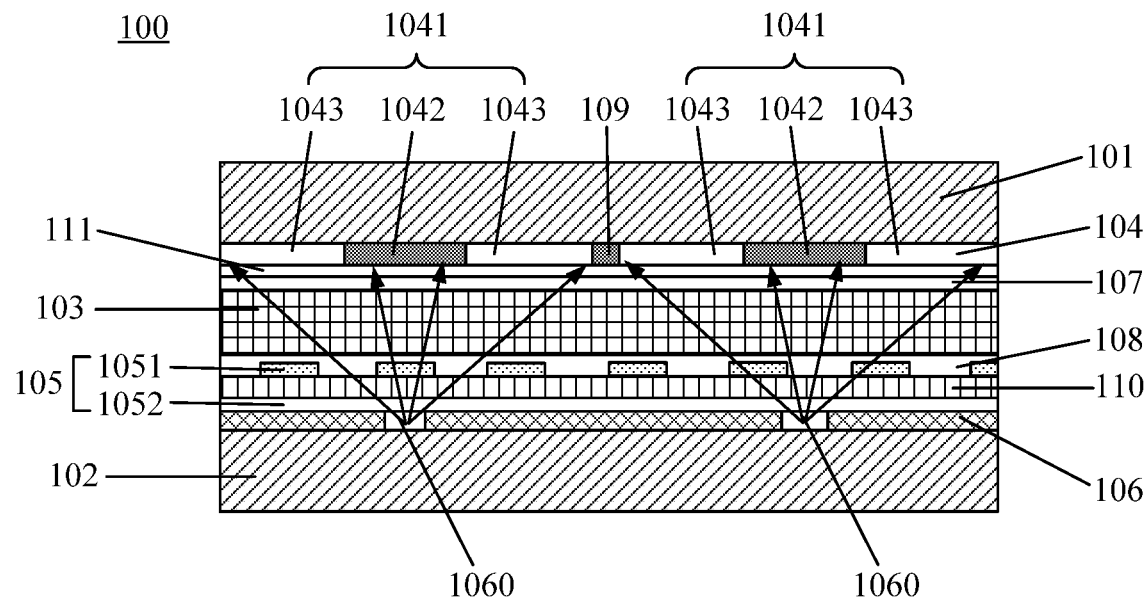
FIG. 3 is a schematic cross-sectional view showing the liquid crystal grating of FIG. 1 in another grayscale display state.

FIG. 3 is a schematic cross-sectional view showing the liquid crystal grating 100 in another grayscale display state. As shown in FIG. 3, under the control of the control voltages applied to the slit electrodes 1051 and the transparent electrode layer 1052, the liquid crystal layer 103 directs the respective light beams entering the liquid crystal grating 100 via the plurality of light input ports 1060 so that they impinge on respective ones of the plurality of sub-pixels 1041 at a maximum divergence angle. In this case, the quantum dot regions 1043 of the plurality of sub-pixels 1041 receive a maximum amount of input light and are excited to emit a maximum amount of output light, such that the liquid crystal grating 100 is in a grayscale state of e.g., L255. It will be understood that, depending on the control voltages applied to the electrode structure 105, the liquid crystal grating 100 may also be controlled to display other grayscales between L0 and L255.

In the examples of FIGS. 1 and 3, additional light-shielding regions 109 are provided between directly adjacent ones of the plurality of sub-pixels 1041. The additional light-shielding regions 109 can prevent cross-coloring between directly adjacent sub-pixels, resulting in a better display effect. The liquid crystal grating 100 may also, in some exemplary embodiments, include a diffusion layer 111 disposed between the quantum dot layer 104 and the first alignment layer 107. The diffusion layer 111 is used such that the light beams from the liquid crystal layer 103 are more prone to divergence.

Different from achieving different grayscales by modulating the polarization of liquid crystal molecules in a conventional LCD, the liquid crystal grating 100 instead realizes different grayscales by modulating the divergence of the liquid crystal layer 103. This is advantageous in that it eliminates the need for the polarizer, thereby eliminating the loss of light caused by the polarizer, and facilitating the improvement of light transmittance.

In the example of FIGS. 1 and 3, the slit electrodes 1051 are shown as being formed on the insulating layer 110 and covered by the second alignment layer 108. Alternatively, the slit electrodes 1051 may be disposed completely inside the second alignment layer 108. In some embodiments, the transparent electrode layer 1052 (and thus the insulating layer 110) may be omitted, in which case directly adjacent ones of the slit electrodes 1051 may be applied with respective control voltages having opposite polarities. This may be advantageous in that such a liquid crystal grating 100 will have a reduced number of layers and a reduced thickness, resulting in further increased transmittance.

Figure 4:
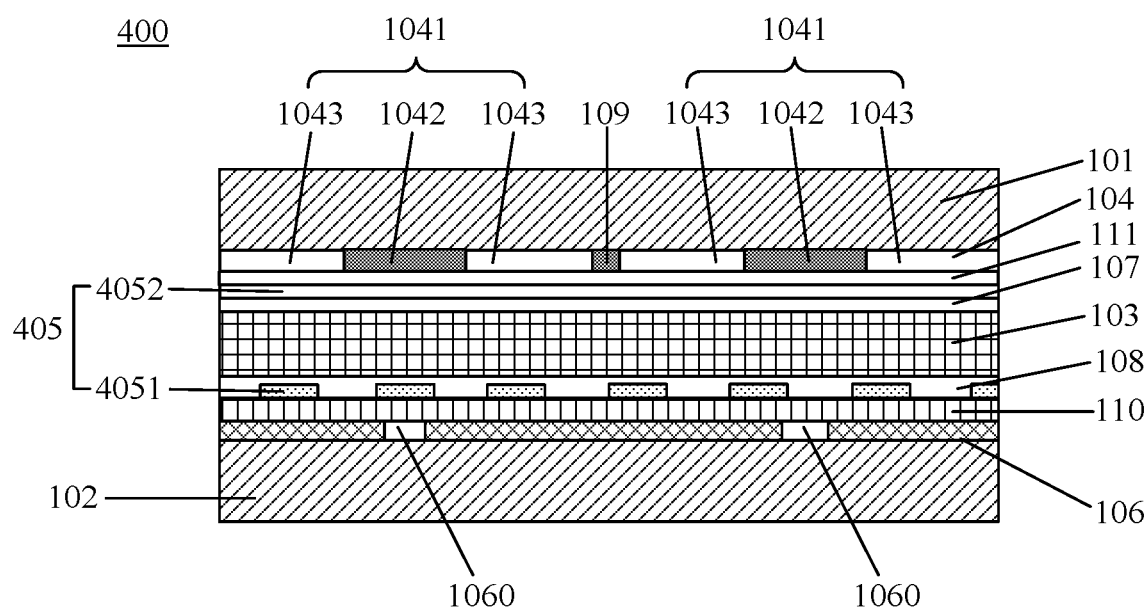
FIG. 4 is a schematic cross-sectional view of a variation of the liquid crystal grating of FIG. 1.

FIG. 4 is a schematic cross-sectional view of a variation 400 of the liquid crystal grating 100 of FIG. 1. The same reference numerals as in FIG. 1 indicate the same elements as in FIG. 1. Referring to FIG. 4, the liquid crystal grating 400 differs from the liquid crystal grating 100 in that it includes an electrode structure 405 instead of the electrode structure 105.

In this embodiment, the electrode structure 405 includes a plurality of slit electrodes 4051 disposed in the second alignment layer 108 and a transparent electrode layer 4052 disposed between the quantum dot layer 104 and the first alignment layer 107. The configuration of the slit electrodes 4051 may be the same as those of the slit electrodes 1051 described above with respect to FIGS. 1-3 and therefore will not be described in detail here. Arranging the transparent electrode layer 4052 to oppose to the slit electrodes 4051 with respect to the liquid crystal layer 103 provides additional design options. For example, it allows the insulating layer 110 to be omitted, thereby reducing the thickness of the liquid crystal grating 400 and potentially increasing the transmittance.

Figure 5:
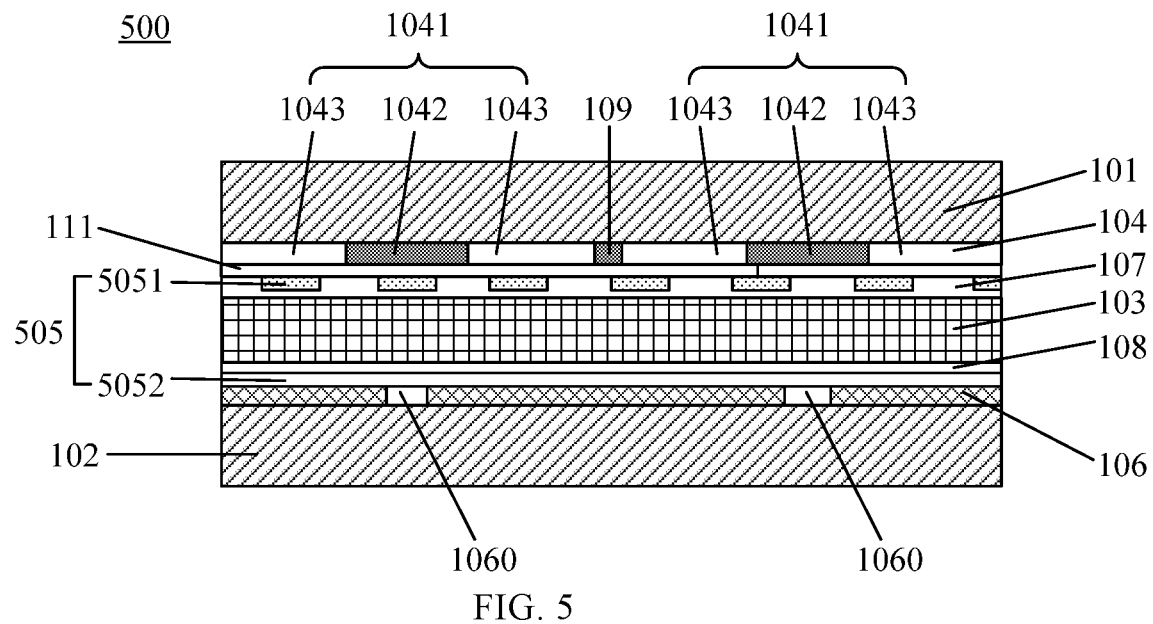
FIG. 5 is a schematic cross-sectional view of another variation of the liquid crystal grating of FIG. 1.

FIG. 5 is a schematic cross-sectional view of another modification 500 of the liquid crystal grating 100 of FIG. 1. The same reference numerals as in FIG. 1 indicate the same elements as in FIG. 1. Referring to FIG. 5, the liquid crystal grating 500 differs from the liquid crystal grating 100 in that it includes an electrode structure 505 instead of the electrode structure 105.

In this embodiment, the electrode structure 505 includes a plurality of slit electrodes 5051 disposed in the first alignment layer 107 and a transparent electrode layer 5052 disposed between the second alignment layer 108 and the light input layer 106. The configuration of the slit electrodes 5051 may be the same as those of the slit electrodes 1051 described above with respect to FIGS. 1-3 and therefore will not be described in detail here. Similar to the liquid crystal grating 400, arranging the transparent electrode layer 5052 to oppose to the slit electrodes 5051 with respect to the liquid crystal layer 103 provides additional design options. For example, it may eliminate the need for the insulating layer 110, thereby reducing the thickness of the liquid crystal grating 500 and potentially increasing the transmittance.

Figure 6:
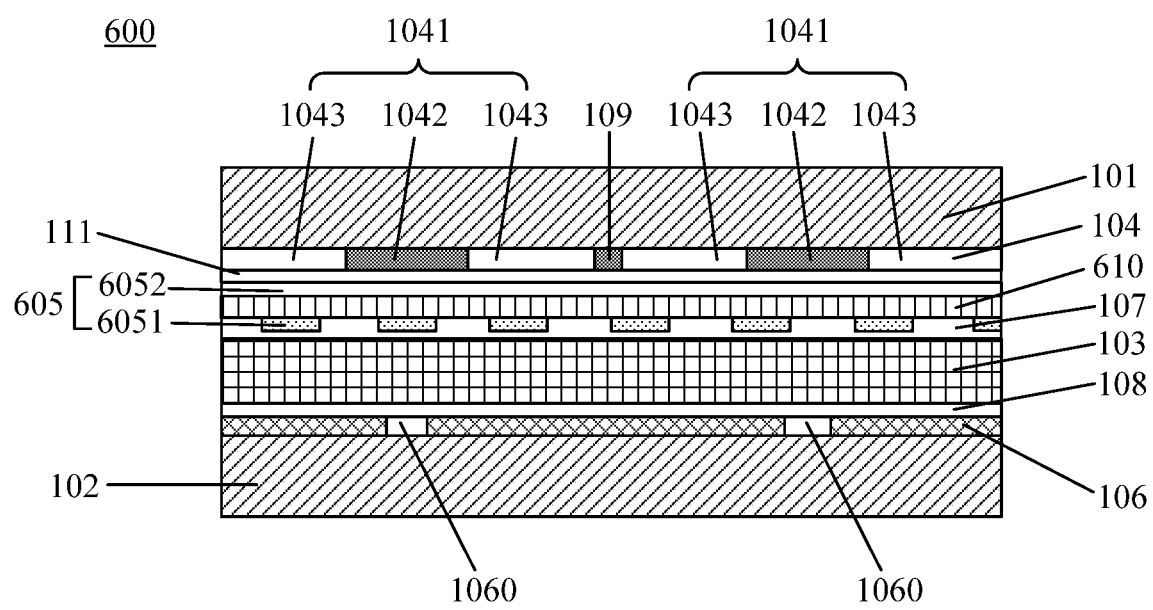
FIG. 6 is a schematic cross-sectional view of still another variation of the liquid crystal grating of FIG. 1.

FIG. 6 is a schematic cross-sectional view of still another variation 600 of the liquid crystal grating 100 of FIG. 1. The same reference numerals as in FIG. 1 indicate the same elements as in FIG. 1. Referring to FIG. 6, the liquid crystal grating 600 differs from the liquid crystal grating 100 in that it includes an electrode structure 605 instead of the electrode structure 105.

In this embodiment, the electrode structure 605 is disposed on the first substrate 101. Specifically, the electrode structure 605 includes a plurality of slit electrodes 6051 disposed in the first alignment layer 107 and a transparent electrode layer 6052 disposed between the quantum dot layer 104 and the first alignment layer 107. The configuration of the slit electrodes 6051 may be the same as those of the slit electrodes 1051 described above with respect to FIGS. 1-3 and therefore will not be described in detail here. The insulating layer 610, formed of, for example, polyvinyl chloride (PVC), is disposed between the transparent electrode layer 6052 and the first alignment layer 107 so as to provide electrical insulation between the transparent electrode layer 6052 and the slit electrodes 6051. Where the slit electrodes 6051 are completely wrapped by the first alignment layer 107, the insulating layer 610 may be omitted, thereby reducing the thickness of the liquid crystal grating 600 and potentially increasing the transmittance.

Figure 7:
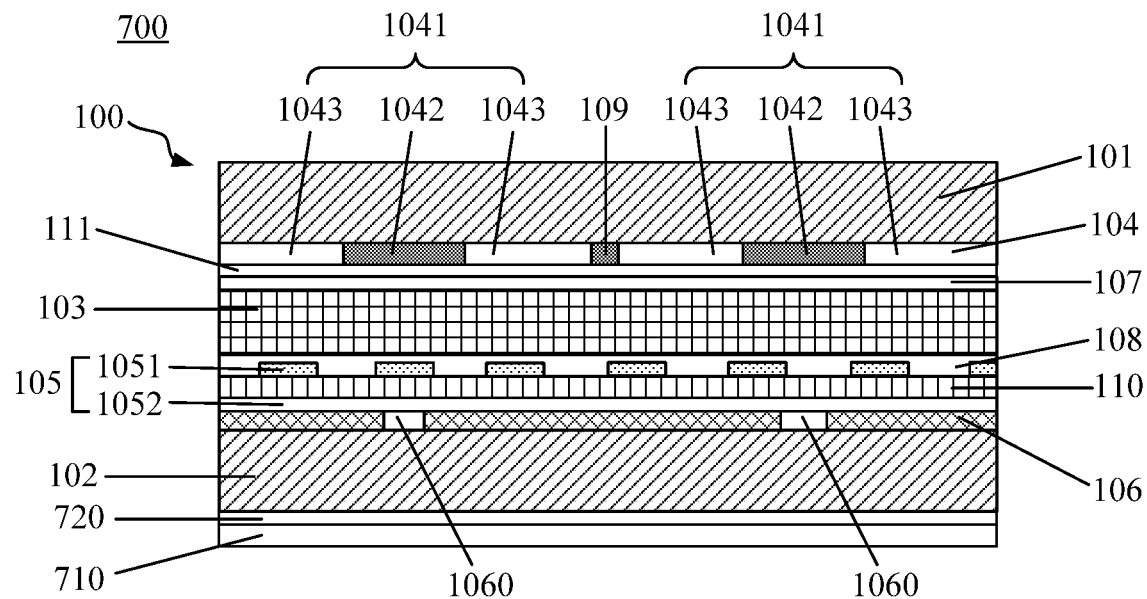
FIG. 7 is a schematic cross-sectional view of a display panel according to an embodiment of the present disclosure.

FIG. 7 is a schematic cross-sectional view of a display panel 700 according to an embodiment of the present disclosure. Referring to FIG. 7, the display panel 700 includes a liquid crystal grating 100, a backlight module 710 disposed on a side of the second substrate 102 facing away from the first substrate 101, and a brightness enhancement film (BEF) layer 720 arranged between the second substrate 102 and the backlight module 720.

The liquid crystal grating 100 has been described in detail above and will not be repeated here.

The backlight module 710 serves as a light source of the liquid crystal grating 100. The light emitted from the backlight module 710 transmits through the BEF layer 720 and the second substrate 102, and then enters the liquid crystal grating 100 via the plurality of light input ports 1060. The backlight module 710 may be formed of any suitable light sources such as, for example, cold cathode fluorescent lamps (CCFLs), light-emitting diodes (LEDs), organic light emitting diodes (OLEDs), micro-LEDs.

The BEF layer 720, such as a micro-prism structured optical film provided by 3M Corporation, is used to modulate light beams emitted from the backlight module 710 such that they have a certain degree of collimation. In some embodiments, the light beams emitted from the backlight module 710 may be modulated by the BEF layer 720 to have a divergence angle within ±30° around the thickness direction of the display panel 700, for example, ±6°. As such, in the default state in which the electrode structure 105 is not applied with control voltages, the respective light beams entering the liquid crystal grating 100 via the plurality of light input ports 1060 will only impinge on the respective light-shielding regions 1042 of the plurality of sub-pixels 1041, so that the display panel 700 displays the grayscale of L0. A higher collimation of the input light beams will be advantageous because it allows the use of light-shielding regions 1042 with smaller areas, further increasing the transmittance of the display panel 700.

In the example of FIG. 7, a portion of the light input layer 106 other than the light input ports 1060 is a light-shielding material, such as a black matrix material. This prevents the light beams emitted from the backlight module 710 from entering the liquid crystal grating 100 via the portion other than the light input ports 1060 of the light input layer 106, thereby ensuring the normal operation of the liquid crystal grating 100.

It will be understood that the display panel 700 shown in FIG. 7 is exemplary and that other embodiments are contemplated in the present disclosure. For example, the liquid crystal grating 100 in the display panel 700 may be replaced with any of the liquid crystal gratings 400, 500, and 600 described above with respect to FIGS. 4-6.

Due to the absence of the polarizers and color filters, the liquid crystal panel 700 has the same advantages as the previously described liquid crystal grating embodiments, including the improved transmittance. In the example of FIG. 7, assuming that the light beams from the BEF layer 720 has a divergence angle of ±30°, the light input port 1060 has a width of 2.5 µm, the ratio of the thickness of the slit electrode 1051 to the thickness of the second alignment layer 108 is ⅔, the liquid crystal layer 103 has a thickness of 5 µm, the light-shielding region 1042 has a width of 12.3 µm, the additional light-shielding region 109 has a width of 2 µm, and each sub-pixel 1041 has a width of 24.15 µm, then a transmittance of 12.32% can be realized.

Figure 8:
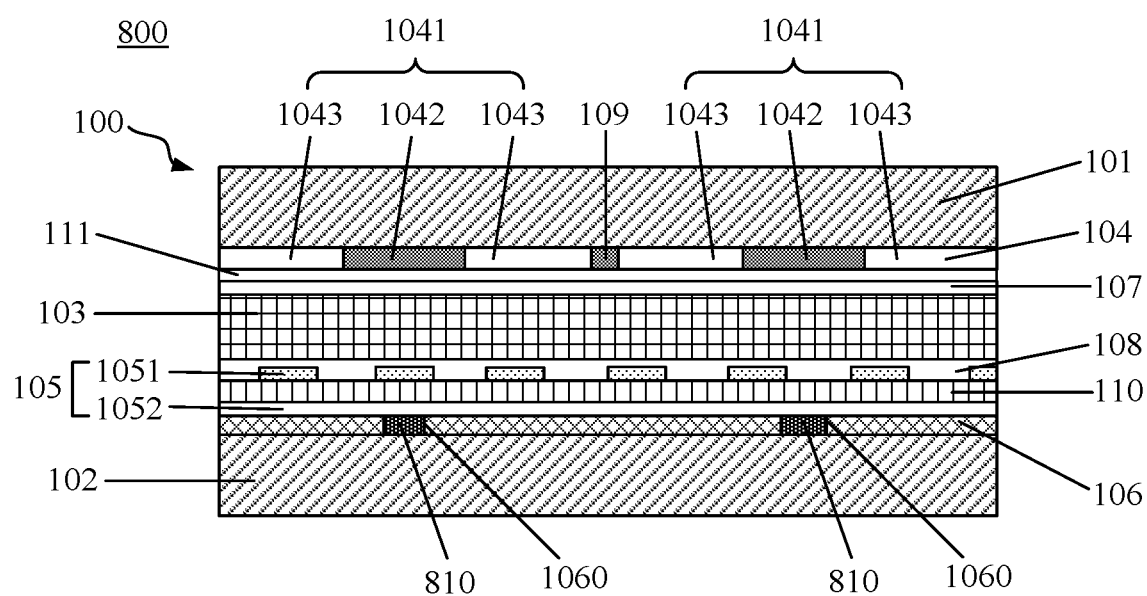
FIG. 8 is a schematic cross-sectional view of a display panel according to another embodiment of the present disclosure.

FIG. 8 is a schematic cross-sectional view of a display panel 800 according to another embodiment of the present disclosure. Referring to FIG. 8, the display panel 800 includes a liquid crystal grating 100 and a plurality of collimated light sources 810.

The liquid crystal grating 100 has been described in detail above and will not be repeated here.

The plurality of collimated light sources 810 are disposed at respective ones of the plurality of light input ports 1060 of the liquid crystal grating 100 for providing the liquid crystal grating 100 with input beams having a certain degree of collimation. In some embodiments, the collimated light sources 810 may be arranged such that the light beams emitted by them have a divergence angle within ±30°, e.g., ±6°, around the thickness direction of the display panel 800. The collimated light sources 810 may take any suitable form including, and not limited to, condenser lensed LEDs, micro-nano structured optics, and laser diodes.

It will be understood that the display panel 800 shown in FIG. 8 is exemplary and that other embodiments are contemplated in the present disclosure. For example, the liquid crystal grating 100 in the display panel 800 may be replaced with any of the liquid crystal gratings 400, 500, and 600 described above with respect to FIGS. 4-6.

Compared with the display panel 700 of FIG. 7, the backlight module 710 and the brightness enhancement film layer 720 are no longer needed in the display panel 800. This provides additional advantages in that the light emitted from the collimated light sources 810 can be more efficiently utilized, and the thickness of the display panel 800 is reduced due to the omission of the backlight module 710 and the brightness enhancing film layer 720. In some embodiments, a portion of the light input layer 106 other than the light input port 1060 is a transparent material. This allows the liquid crystal panel 800 to be used as a so-called transparent display, which finds a wide range of applications in many scenarios.

Variations to the disclosed embodiments can be understood and effected by those skilled in the art in practicing the claimed subject matter from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A liquid crystal grating, comprising:
   a first substrate;
   a second substrate arranged opposite to the first substrate;
   a liquid crystal layer arranged between the first substrate and the second substrate;
   a quantum dot layer arranged between the first substrate and the liquid crystal layer, wherein the quantum dot layer comprises a plurality of sub-pixels distributed in an array, and wherein each of the sub-pixels comprises:
      a light-shielding region located at a central portion of the sub-pixel and
      a quantum dot region that is separate from the light-shielding region;
   an electrode structure, wherein the electrode structure is arranged between the first substrate and the second substrate and distributed across the plurality of sub-pixels; and
   a light input layer, wherein the light input layer is arranged between the second substrate and the liquid crystal layer, and wherein the light input layer defines a plurality of light input ports, each light input port arranged opposite to the light-shielding region of a respective one of the sub-pixels,
   wherein the electrode structure is configured to change light transmission of the liquid crystal layer depending on control voltages applied to the electrode structure, thereby changing respective divergences of respective light beams after the light beams transmit through the liquid crystal layer, and
   wherein the light beams enter the liquid crystal grating via the plurality of light input ports, thereby changing respective amounts of the light beams impinging on respective ones of the quantum dot regions of the plurality of sub-pixels.

2. The liquid crystal grating of claim 1, further comprising a first alignment layer arranged between the quantum dot layer and the liquid crystal layer and a second alignment layer arranged between the liquid crystal layer and the light input layer.

3. The liquid crystal grating of claim 2, wherein the electrode structure comprises a plurality of slit electrodes arranged in the second alignment layer and distributed in an array, and wherein the slit electrodes are arranged such that an orthographic projection of each of the sub-pixels on the second alignment layer covers a respective subset of the slit electrodes.

4. The liquid crystal grating of claim 3, wherein the electrode structure further comprises a transparent electrode layer arranged at a position selected from the group consisting of between the second alignment layer and the light input layer and between the quantum dot layer and the first alignment layer.

5. The liquid crystal grating of claim 2, wherein the electrode structure comprises a plurality of slit electrodes arranged in the first alignment layer and distributed in an array, and wherein the slit electrodes are arranged such that an orthogonal projection of each of the sub-pixels on the first alignment layer covers a respective subset of the slit electrodes.

6. The liquid crystal grating of claim 5, wherein the electrode structure further comprises a transparent electrode layer arranged at a position selected from the group consisting of between the second alignment layer and the light input layer and between the quantum dot layer and the first alignment layer.

7. The liquid crystal grating of claim 1, wherein the plurality of light input ports penetrates through the light input layer, and wherein a portion of the light input layer other than the plurality of light input ports is a light-shielding material.

8. The liquid crystal grating of claim 1, further comprising a plurality of collimated light sources arranged at respective ones of the plurality of light input ports, wherein a portion of the light input layer other than the plurality of light input ports is a transparent material.

9. The liquid crystal grating of claim 1, further comprising respective additional shading regions arranged between directly adjacent ones of the plurality of sub-pixels.

10. The liquid crystal grating of claim 1, further comprising a diffusion layer arranged between the quantum dot layer and the first alignment layer.

11. A display panel, comprising:
    a liquid crystal grating comprising:
       a first substrate;
       a second substrate arranged opposite to the first substrate;
       a liquid crystal layer arranged between the first substrate and the second substrate;
       a quantum dot layer arranged between the first substrate and the liquid crystal layer, wherein the quantum dot layer comprises a plurality of sub-pixels distributed in an array, and wherein each of the sub-pixels comprises:

a light-shielding region located at a central portion of the sub-pixel, and a quantum dot region that is separate from the light-shielding region;

an electrode structure arranged between the first substrate and the second substrate, wherein the electrode structure is distributed across the plurality of sub-pixels; and a light input layer arranged between the second substrate and the liquid crystal layer, wherein the light input layer defines a plurality of light input ports each arranged opposite to the light-shielding region of a respective one of the sub-pixels, wherein the electrode structure is configured to change light transmission of the liquid crystal layer depending on control voltages applied to the electrode structure, thereby changing respective divergences of respective light beams after the light beams transmit through the liquid crystal layer, and wherein the light beams enter the liquid crystal grating via the plurality of light input ports, thereby changing respective amounts of the light beams impinging on respective ones of the quantum dot regions of the plurality of sub-pixels.

12. The display panel of claim 11, wherein the liquid crystal grating further comprises a first alignment layer arranged between the quantum dot layer and the liquid crystal layer and a second alignment layer arranged between the liquid crystal layer and the light input layer.

13. The display panel of claim 12, wherein the electrode structure comprises a plurality of slit electrodes arranged in the second alignment layer and distributed in an array, and wherein the slit electrodes are arranged such that an orthographic projection of each of the sub-pixels on the second alignment layer covers a respective subset of the slit electrodes.

14. The display panel of claim 13, wherein the electrode structure further comprises a transparent electrode layer arranged at a position selected from the group consisting of between the second alignment layer and the light input layer and between the quantum dot layer and the first alignment layer.

15. The display panel of claim 12, wherein the electrode structure comprises a plurality of slit electrodes arranged in the first alignment layer and distributed in an array, and wherein the slit electrodes are arranged such that an orthogonal projection of each of the sub-pixels on the first alignment layer covers a respective subset of the slit electrodes.

16. The display panel of claim 15, wherein the electrode structure further comprises a transparent electrode layer arranged at a position selected from the group consisting of between the second alignment layer and the light input layer and between the quantum dot layer and the first alignment layer.

17. The display panel of claim 11, further comprising:
a backlight module arranged at a side of the second substrate facing away from the first substrate; and
a brightness enhancement film layer arranged between the second substrate and the backlight module,
wherein each of the plurality of light input ports penetrates the light input layer, and
wherein a portion of the light input layer apart from the plurality of light input ports is a light-shielding material.

18. The display panel of claim 11, further comprising a plurality of collimated light sources arranged at respective ones of the plurality of light input ports.

19. The display panel of claim 18, wherein a portion of the light input layer apart from the plurality of light input ports is a transparent material.

20. The display panel of claim 11, further comprising respective additional light-shielding regions arranged between directly adjacent ones of the plurality of sub-pixels, and a diffusion layer arranged between the quantum dot layer and the first alignment layer.

* * * * *